July 5, 1949.    J. KARMAZIN    2,475,566
METHOD FOR MANUFACTURING TUBING
Filed Jan. 8, 1948
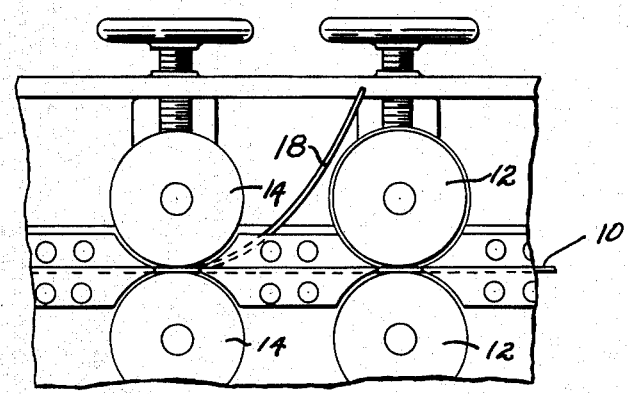
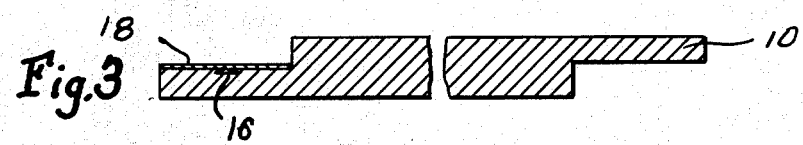
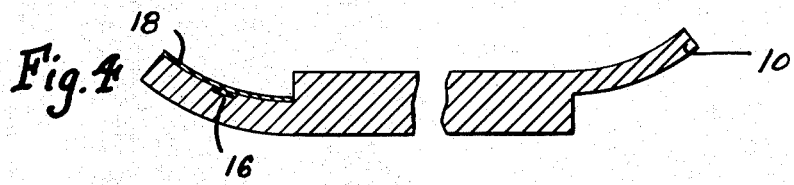
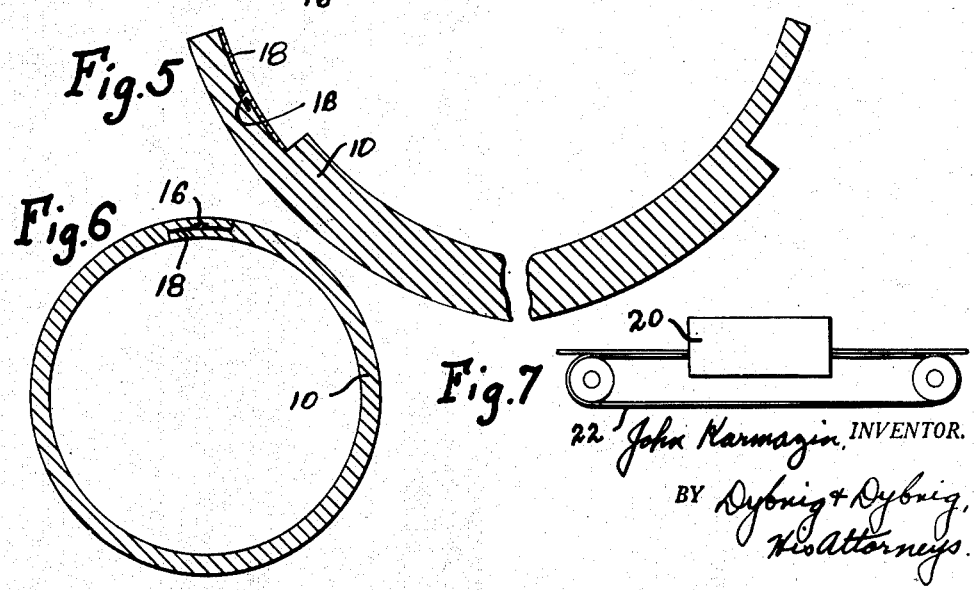
John Karmazin, INVENTOR.
BY Dybvig & Dybvig,
His Attorneys.

Patented July 5, 1949

2,475,566

UNITED STATES PATENT OFFICE 2,475,566

METHOD FOR MANUFACTURING TUBING

John Karmazin, Grosse Ile, Mich.

Application January 8, 1948, Serial No. 1,235

6 Claims. (Cl. 29—156)

This invention relates to tubing and to the method for manufacturing tubing.

This invention is an improvement over the invention set forth in my copending application Serial No. 789,593, filed December 4, 1947.

One object of this invention is to provide an improved method particularly suitable for manufacturing long lengths of low cost steel tubing.

In the process of manufacturing tubing from a metal strip, it is common practice to reduce the thickness of the edges of the strip and to thereafter bend the strip into tube form with the reduced edges arranged in overlapping relationship. The problem of bonding the overlapping edges introduces numerous complications which are intended to be overcome by the invention set forth herein. In reducing the thickness of the edge portions of the strip, it is common practice to pass the strip between suitable rollers which flatten out the edge portions. In so doing, each flattened edge portion is work hardened to such an extent that it becomes difficult to perform any additional desired deforming operation on the edge portion. It is an object of this invention to provide a bonding material anchoring groove in the one edge of the strip before the thickness of the edge has been reduced and to place bonding material in the groove before passing the strip between the rollers which reduce the thickness of the outer edge of the strip. In this manner, the same rollers which flatten out the edge of the strip flatten out the bonding material and at the same time lock the bonding material in place.

Another object of this invention is to provide an improved method of supplying a thin layer of bonding material to the overlapping portions of the metal strip in such a manner that the bonding material does not interfere with the tube forming operations.

Another object of this invention is to provide a steel tubing which is capable of being bent, flattened or otherwise deformed without injury to the seam.

Other objects and advantages reside in the construction of parts, the combination thereof and the mode of operation, as will become more apparent from the following description.

In the drawings:

Figure 1 is a fragmentary sectional view showing somewhat diagrammatically a portion of the tube forming apparatus used in the manufacture of the tubing.

Figure 2 is a sectional view on an enlarged scale showing the cross sectional shape of the metal strip after having passed between the first pair of forming rollers.

Figure 3 is a similar sectional view showing the shape of the strip after passing between the second pair of forming rollers.

Figure 4 is a sectional view showing the strip after a subsequent operation.

Figure 5 is a sectional view showing the strip in a still later stage.

Figure 6 is a sectional view showing the finished tubing; and

Figure 7 is an elevational view diagrammatically showing a hydrogen brazing furnace used in brazing tubing constructed in accordance with my invention.

Referring now to the drawings wherein I have shown a preferred embodiment of my invention, reference numeral 10 designates a strip of sheet metal used in the manufacture of the tubing. Figure 1 shows the strip 10 passing between a series of pairs of rollers and forming dies used in forming the strip of metal into tube form. A first pair of rollers 12 serve to form a channel 16 adjacent the one edge of the strip. The channel 16 is preferably shaped so as to have projecting edge portions 19 as shown in Figure 2.

It will be noted that the channel 16 is formed along the one edge of the strip before that edge of the strip is flattened. A second pair of rollers 14 serve to flatten out the edges of the strip so as to form the strip into the shape shown in Figure 3. A bonding wire 18 is placed over the groove 16 as indicated in Figure 1 before the strip 10 and the bonding material 18 is passed between the rollers 14 so that the bonding material is flattened out into the shape in which it is shown in Figure 3 in the same operation in which the edges of the strip 10 are flattened. As illustrated, the projecting edges 19 of the groove will be rounded and will be bent substantially into the shape shown in Figure 3 so as to firmly lock the bonding material in place so that as the strip is passed between subsequent forming dies for bending the strip into tube form, the bonding material will remain in place.

After the edges of the strip have been flattened as shown in Figure 3 of the drawing, the edges are then bent into the curved shape shown in Figure 4. Subsequent forming operations, which are well known and need no further description, bend the strip into tube form as shown in Figure 6 with the opposite edges of the strip in overlapping engagement.

It will be noted that the brazing material is thus securely held in place directly at the point where it is needed whereby it is not necessary to insert an excessive amount of bonding material for the purpose of insuring an adequate supply of bonding material reaching the overlapping surfaces. By virtue of this construction and arrangement, it is obvious that there will be no surplus bonding material available for collecting in puddles in the tube or for smearing up the exterior surface of the tube. Thus, it is possible to manufacture long lengths of tubing and to stack the tubing on the endless conveyer 22 used in conveying the tubing through the hydrogen brazing furnace 20 in accordance with practice which is now well known. While there are certain minor advantages to be gained by using copper coated steel, there are other advantages to be gained by using un-coated steel or cupro nickel. The small amount of copper which normally forms the coating of copper coated steel tubing does not afford adequate protection against rusting in some types of installations and for that reason, it is customary in those cases to dip the finished tubing, radiators or the like in a bath of molten lead. When it is necessary or desirable to dip the tubing in a lead bath, the copper coating is superfluous. An advantage of using non-coated steel is that there is less danger of the tubes becoming brazed to one another as stacks of tubes pass through the furnace.

By flattening out the brazing material, it is possible to use a very small amount of brazing material with the result that practically all of the brazing material is held directly in the seam of the tube and there is no surplus material left over to form puddles or to braze adjacent tubes to one another. Thus by virtue of the method and apparatus set forth hereinabove, it is possible to stack the tubes upon one another during the hydrogen brazing operation. This results in vastly increasing the rate of production without the need for increasing the furnace capacity. For purposes of illustration, I have shown the use of a single channel 16 whereas two or even more channels or bonding material anchoring pocket means could be provided. Likewise, additional brazing wires could be used. The number of channels or pocket means and the number of wires used would depend upon the width of the overlapping edges etc.

For purposes of disclosing this invention, reference has been made to the use of round brazing wire whereas other shapes and types of bonding material may be used.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of manufacturing metal stock for tubing which comprises forming a longitudinally extending groove adjacent one edge of a strip of metal, positioning a length of bonding metal over the groove, compressing and flattening the marginal portion of the strip to reduce the marginal portion of the strip to less thickness than the intermediate portion of the strip and utilizing the step of compressing and flattening the marginal portion to simultaneously securely embed the bonding metal within the groove while flattening the exposed portion of the bonding metal.

2. The method of manufacturing metal stock for tubing which comprises forming a longitudinally extending groove adjacent one edge of a strip of metal, positioning a length of bonding material over the groove, rolling the marginal portions on opposite sides of the strip of metal to reduce the marginal portion of the strip to less thickness than the intermediate portion of the strip and utilizing the step of rolling the marginal portion to simultaneously securely embed the bonding material within the groove while flattening the exposed portion of the bonding metal.

3. The method of manufacturing metal tubing which comprises forming a longitudinally extending groove adjacent one edge of a strip of metal, positioning a length of bonding metal over the groove, compressing and flattening the marginal portion of the strip to reduce the marginal portion of the strip to less thickness than the intermediate portion of the strip and utilizing the step of compressing and flattening the marginal portion to simultaneously securely embed the bonding metal within the groove while flattening the exposed portion of the bonding metal, forming the strip of metal into the shape of a tube with the marginal portions overlapping and then applying heat to the tube so as to melt said bonding metal.

4. The method of manufacturing metal tubing comprising forming a longitudinally extending groove adjacent one edge of a strip of metal, positioning a length of bonding metal over the groove, rolling the marginal portions on opposite sides of the strip of metal to reduce the marginal portion of the strip to less thickness than the intermediate portion of the strip and utilizing the step of rolling the marginal portion to simultaneously embed the bonding metal within the groove while flattening the exposed portion of the bonding metal, forming the strip into the shape of a tube with the marginal portions of reduced thickness arranged in overlapping relationship, and thereafter applying heat to the metal strip so as to melt the bonding metal.

5. The method of manufacturing metal stock for tubing which comprises forming a longitudinally extending groove adjacent one edge of a strip of metal, positioning a length of bonding metal larger than said groove over the groove, compressing and flattening the marginal portion of the strip to reduce the marginal portion of the strip to less thickness than the intermediate portion of the strip and utilizing the step of compressing and flattening the marginal portion to simultaneously securely embed a portion of the bonding material within the groove and extrude another portion of the bonding material outwardly from the groove to overlie the reduced marginal portion of the strip.

6. The method of manufacturing metal stock for tubing which comprises forming a longitudinally extending groove adjacent one edge of a strip of metal, positioning a length of bonding metal larger than said groove over the groove, compressing and flattening the marginal portion of the strip to reduce the marginal portion of the strip to less thickness than the intermediate portion of the strip and utilizing the step of compressing and flattening the marginal portion to simultaneously securely embed a portion of the bonding material within the groove and extrude another portion of the bonding material outwardly from the groove to overlie the reduced marginal portion of the strip, forming the strip of metal into the shape of a tube with the marginal portions overlapping and then applying heat to the tube so as to melt said bonding metal.

JOHN KARMAZIN.

REFERENCES CITED

The following references are of record in the file of this patent:

UNITED STATES PATENTS

| Number | Name | Date |
|---|---|---|
| 155,180 | Coes | Sept. 22, 1847 |
| 400,869 | Norton | Apr. 2, 1889 |
| 807,264 | Greenfield | Dec. 12, 1905 |
| 807,432 | Blakey | Dec. 19, 1905 |
| 1,383,172 | Sweeney | June 28, 1921 |
| 1,797,289 | Kotch | Mar. 24, 1931 |
| 1,933,279 | Quarnstrom | Oct. 31, 1933 |
| 2,012,889 | McIntyre | Aug. 27, 1935 |
| 2,063,789 | Firth | Dec. 8, 1936 |
| 2,210,338 | Quarnstrom | Aug. 6, 1940 |
| 2,361,089 | Cox | Oct. 24, 1944 |
| 2,375,068 | Bennett | May 1, 1945 |